US010467113B2

(12) United States Patent
Delgado Campos

(10) Patent No.: US 10,467,113 B2
(45) Date of Patent: Nov. 5, 2019

(54) EXECUTING PROGRAMS THROUGH A SHARED NVM POOL

(71) Applicant: HEWLETT PACKARD ENTERPRISE DEVELOPMENT LP, Houston, TX (US)

(72) Inventor: Allan Delgado Campos, Heredia (CR)

(73) Assignee: Hewlett Packard Enterprise Development LP, Houston, TX (US)

( * ) Notice: Subject to any disclaimer, the term of this patent is extended or adjusted under 35 U.S.C. 154(b) by 136 days.

(21) Appl. No.: 15/618,123

(22) Filed: Jun. 9, 2017

(65) Prior Publication Data
US 2018/0357139 A1    Dec. 13, 2018

(51) Int. Cl.
*G06F 11/20*    (2006.01)
*G06F 9/30*    (2018.01)

(52) U.S. Cl.
CPC ............ *G06F 11/2046* (2013.01); *G06F 9/30* (2013.01); *G06F 11/2033* (2013.01); *G06F 11/2041* (2013.01)

(58) Field of Classification Search
CPC ... G06F 11/20; G06F 11/2023; G06F 11/2046
USPC ........................................................ 714/4.11
See application file for complete search history.

(56) References Cited

U.S. PATENT DOCUMENTS

| 5,134,712 | A | * | 7/1992 | Yamamoto | .......... | G06F 11/1438 |
| | | | | | | 714/13 |
| 5,386,560 | A | * | 1/1995 | McCauley | .......... | G06F 13/1642 |
| | | | | | | 711/165 |
| 7,627,694 | B2 | | 12/2009 | Sreenivasan et al. | | |
| 7,975,173 | B2 | | 7/2011 | Callaway et al. | | |
| 2001/0039548 | A1 | * | 11/2001 | Shinkai | ................. | G06F 16/182 |
| 2002/0049845 | A1 | * | 4/2002 | Sreenivasan | ........... | H04L 69/40 |
| | | | | | | 709/226 |

(Continued)

FOREIGN PATENT DOCUMENTS

WO    2017/019001 A1    2/2017

OTHER PUBLICATIONS

Shashi Kanth Lakshmikantha, "Beowulf Parallel Workstation ~ An Instantiation of the Cluster of Workstations Paradigm," Date: Unknown, pp. 1-19 [online], Retrieved from the Internet on Nov. 18, 2016 at URL: <http://www.uta.edu/cse/levine/aos/reports/laks_term_paper.doc>.

(Continued)

*Primary Examiner* — Kamini B Patel
(74) *Attorney, Agent, or Firm* — Hewlett Packard Enterprise Patent Department

(57) ABSTRACT

An example method for performing failover operations is disclosed. The example disclosed herein comprises assigning an assigned memory region for a first program to store data from the first program, wherein the assigned memory region is a part of a shared NVM pool. The example further comprises executing a plurality of standby processes which are instances from the first program, and distributing the execution of the standby processes across a plurality of computing nodes. The process further comprising electing one standby process as an active process, detecting when the active process stops executing the first program instructions through the shared NVM pool, and reassigning the first program instructions execution to one of the standby processes through the shared NVM pool.

18 Claims, 12 Drawing Sheets

(56) References Cited

U.S. PATENT DOCUMENTS

| | | | |
|---|---|---|---|
| 2006/0224918 A1* | 10/2006 | Koike | G06F 11/2097 |
| | | | 714/11 |
| 2009/0106328 A1 | 4/2009 | Callaway et al. | |
| 2011/0191627 A1 | 8/2011 | Koning et al. | |
| 2012/0017037 A1* | 1/2012 | Riddle | G06F 16/24569 |
| | | | 711/103 |
| 2012/0036169 A1 | 2/2012 | Grinshpun et al. | |
| 2016/0352347 A1* | 12/2016 | Fernando | H03M 1/1009 |

OTHER PUBLICATIONS

Kimberly Keeton, "The Machine: An Architecture for Memory-centric Computing", ROSS '15 Proceedings of the 5th International Workshop on Runtime and Operating Systems for Supercomputers, Article No. 1, 2015, 45 pages.

GitHub, "Atlas: Programming for Persistent Memory", available online at <https://github.com/HewlettPackard/Atlas>, 2017, 3 pages.

* cited by examiner

EXECUTING PROGRAMS THROUGH A SHARED NVM POOL

BACKGROUND

The ability of a computer system to perform tasks when those tasks are requested to be performed is what is understood as the availability of the computer system. In the art of computing science, a High Availability (HA) computer system is understood as a system designed to ensure certain degree of operation continuity despite the occurrence of system downtime.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Figure 1:
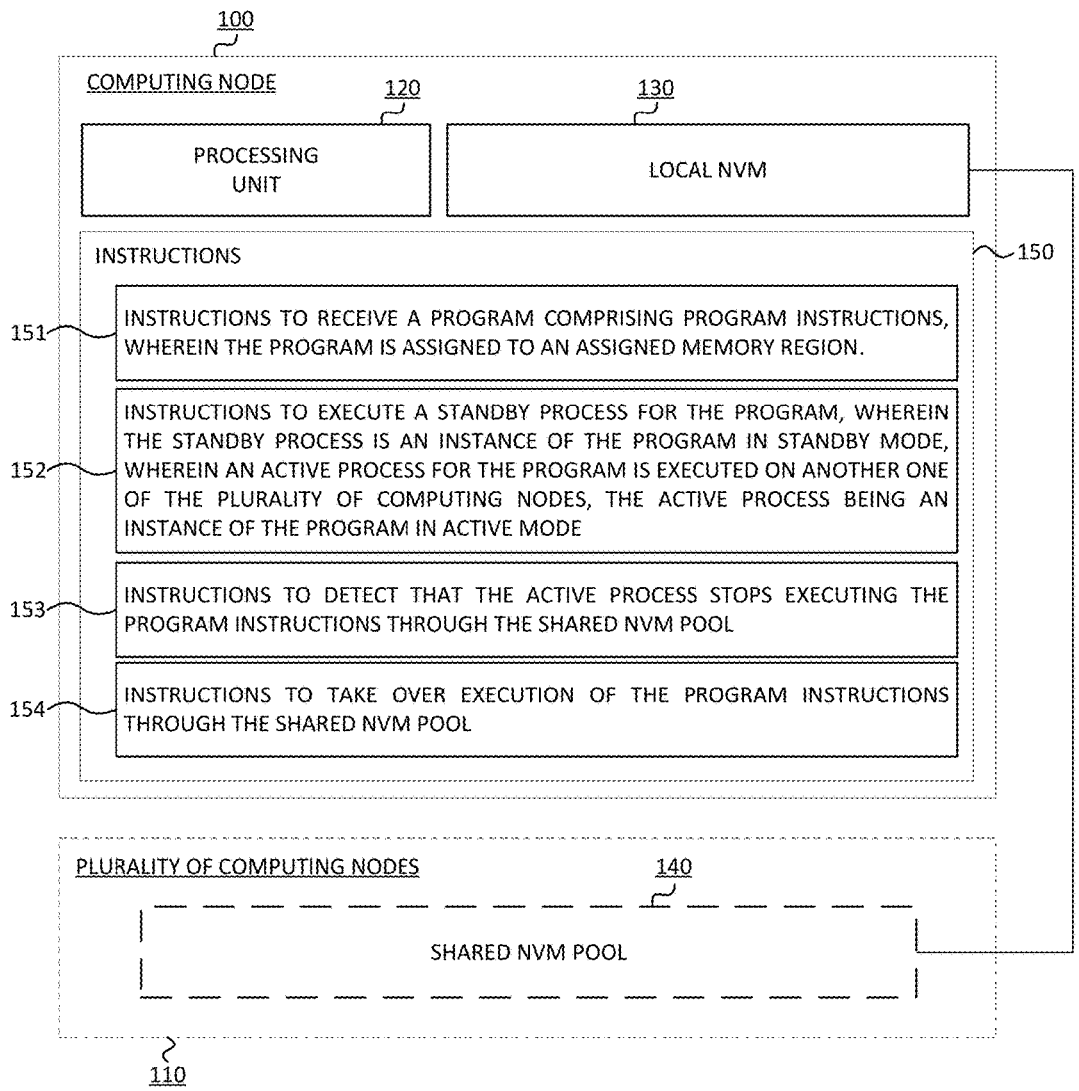
FIG. 1 is a block diagram illustrating an example of a computing node for executing fault-tolerant programs through a shared NVM pool.

The following description is directed to various examples of the disclosure. The examples disclosed herein should not be interpreted, or otherwise used, as limiting the scope of the disclosure, including the claims. In addition, the following description has broad application, and the discussion of any example is meant only to be descriptive of that example, and not intended to indicate that the scope of the disclosure, including the claims, is limited to that example. In the foregoing description, numerous details are set forth to provide an understanding of the examples disclosed herein. However, it will be understood by those skilled in the art that the examples may be practiced without these details. While a limited number of examples have been disclosed, those skilled in the art will appreciate numerous modifications and variations therefrom. It is intended that the appended claims cover such modifications and variations as fall within the scope of the examples. Throughout the present disclosure, the terms "a" and "an" are intended to denote at least one of a particular element. In addition, as used herein, the term "includes" means includes but not limited to, the term "including" means including but not limited to. The term "based on" means based at least in part on.

The ability of a computer system to perform tasks when those tasks are requested to be performed is what is understood as the availability of the computer system. In the art of computing science, a High Availability (HA) computer system is understood as a system designed to ensure certain degree of operation continuity despite the occurrence of system downtime. Therefore, HA may be monitored as a percentage of time per year that the system provides full services. Typical requested system requirements to system vendors are: 99.999% availability (0.001% downtime, 5.25 minutes per year) and 99.9999% availability (0.0001% downtime, 31 seconds per year).

Fault tolerance is generally regarded as the ability to mask, or recover from, erroneous conditions in a system once an error has been detected (e.g., downtime of a system). Fault tolerance is important in certain types of systems where the services provided by software programs have HA requirements in the presence of hardware or software failure. For example, a core aggregation networking switch where a network protocol software is expected to continue processing traffic and taking protocol decisions with no or little disruption after a Central Processing Unit (CPU) failure or a segmentation fault. In the present disclosure, the term "failover" may be understood as the process ensuring the computing system fault tolerance.

In some example architectures for performing failover operations, the system comprises a hardware active module and a hardware standby module. The active module is the instance in charge of performing the program operations as usual. If there is a failure in the active module, a standby module takes place by performing the failover which implies assigning the standby module as the active module to keep performing the program operations as usual. Picking a specific example of a network switch, the network switch may have two independent management modules (e.g., MM1, and MM2), each with its own CPU (e.g., CPU1 in MM1, and CPU2 in MM2), and volatile memory such as Random Access Memory (RAM) (e.g., RAM1 in MM1, and RAM2 in MM2); and persistent storage such as Hard Drives (HD) (e.g., HD1 in MM1, and HD2 in MM2). Following with the example, additional software or logic is required to replicate the running state of the active module into the standby module (e.g., taking MM1 as the active module, and MM2 as the standby module, replicate the data stored in HD1 to the HD2) which increases complexity. This replication takes place as a consequence of the failover, since all software processes need to restore their volatile memory state (e.g., RAM1, and RAM2) from the data persisted in storage (e.g., HD1, and HD2) and the previous may affect the restart time of the computing system after the failover. In the example, a failure detection by the standby module is performed. The failure detection is based on a heartbeat signal going through an internal network connection between the two management modules (e.g., MM1, and MM2), the previous has the drawback of introducing a new potential failure point to the computing system. The new potential failure point may be understood as if one of the internal network interfaces fails, the standby module might interpret the lack of heartbeat as a failover and would attempt to take over while the active module is still running, therefore reducing failure detection reliability. If the system supports more than one standby module, the system may require additional internal network connections and a mechanism to elect the new active module during failover, therefore introducing more potential failure points. In the example, since the failover is run in hardware (e.g., MM1 or MM2), only the active module (e.g., MM1) is performing program operations at a time, since the standby modules (e.g., MM2) are sitting waiting for the active module to fail to perform the failover.

One example of the present disclosure provides a computing system for executing fault-tolerant programs comprising a computing node. The computing node comprises a processing unit, and a local Non Volatile Memory (NVM), wherein the computing node is part of a plurality of computing nodes. The plurality of local NVM from the plurality of computing nodes are connected to each other to form a shared NVM pool. The computing node comprises instructions to receive a program comprising program instructions to be executed, wherein the program instructions execution are assigned to an assigned memory region. The computing node further comprises instructions to execute a standby process for the program, wherein the active process for the program is executed on another one of the plurality of computing nodes. The computing node instructions further detect that the active process stops executing the program instructions through the shared NVM pool, and the standby process takes over execution of the program instructions through the shared NVM pool.

Another example of the present disclosure provides a method for performing failover operations. The method assigns an assigned memory region for a first program to store data from the first program, wherein the assigned memory region is part of a shared NVM pool. The method further executes a plurality of standby processes, wherein the plurality of standby processes are instances from the first program. The method distributes the execution of the standby processes across a plurality of computing nodes. The method elects one standby process from the plurality of standby processes as an active process. The method further detects by the plurality of standby processes when the active process stops executing the first program instructions through the shared NVM pool, and reassigns the first program instructions execution to one of the standby processes though the shared NVM pool.

Now referring to the drawings, FIG. 1 is a block diagram illustrating a system example of a computing node for executing fault-tolerant programs through a shared NVM pool. The computing node 100 may comprise one or more processing units such as a CPU, a System on a Chip (SoC), a single processor, and the like. However, for clarity purposes the one or more processing units may be referred to as "the processing unit" hereinafter. The computing node 100 comprises a processing unit 120, a local NVM 130, and a set of instructions 150. The set of instructions 150 comprises instructions 151-154 that, when executed by the processing unit 120, cause the processing unit 120 to perform the functionality described herein. The local NVM 130 from the computing node 100 is part of a shared NVM pool 140. The NVM pool 140 is the aggrupation of the connected local NVM from an external plurality of computing nodes 110 and the computing node 100.

The NVM is a type of computer memory that enables the system to retrieve stored information even after having been powered off and back on. Examples of NVM include Read-Only Memory (ROM), flash memory, ferroelectric RAM, most types of magnetic computer storage devices (e.g., HD drives, floppy disks, and magnetic tape), optical disks, legacy computer storage methods such as paper tape and punched cards, and the like. The computing node 100 comprise a local NVM 130; each of the external plurality of computing nodes 110, comprise its local NVM (not shown in FIG. 1). The plurality of local NVM from the external plurality of computing nodes 110, and the local NVM 130 are connected to form a shared NVM pool 140. The processing unit 120 from computing node 100 has access to any memory unit within the shared memory pool 140 and the processing unit 120 is able to read/write data therein.

The computing node 100 further comprises a set of instructions 150 that comprises instructions 151-154. Instructions 151 cause the processing unit 120 to receive a program comprising program instructions to be executed. In the present disclosure, a program may be understood as a collection of program instructions that perform a specific task when executed by a computing node (e.g., computing node 100). Instructions 151 further cause the processing unit 120 to assign an assigned memory region within the shared NVM pool 140 to execute the program instructions. There may be multiple ways of assigning memory region. One example of assigning a memory region to execute a specific program instruction is described in FIG. 3.

Instructions 152 cause the processing unit 120 to execute a standby process for the program. The term "process" may be understood herein as an instance of a computer program (e.g., the computer program received via instructions 151) that is being executed. A process contains the program code and its current activity. Depending on the Operating System (OS), a process may be made up of multiple threads of execution that execute instructions concurrently. One or more execution threads may be executed in a single computing node (e.g., computing node 100). Throughout the present disclosure, there is a process distinction: the active process, and the standby processes. The active process is the process that executes the program instructions to be executed, in other words, the active process is the process in active mode. The standby process is the process that monitors the active process, performing failover operations in case the active process fails (e.g., the active process stops executing the program instructions).

Instructions 153 cause the processing unit 120 to detect that an active process running in a computing node from the external plurality of computing nodes 110 stops executing the program instructions (active process failure) through the shared NVM pool. An example of active process failure is disclosed in FIG. 5.

Instructions 153 cause the processing unit 120 to cause the standby process take over execution of the program instructions reassigning the standby process to the active process.

Figure 2:
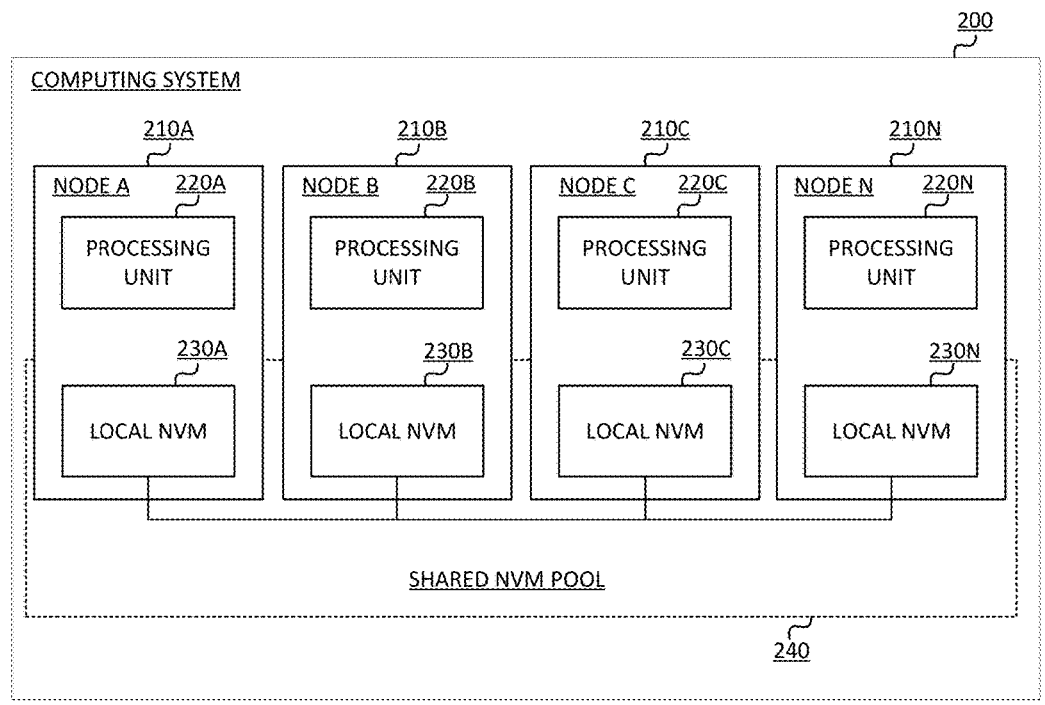
FIG. 2 is a block diagram illustrating an example system for executing fault-tolerant programs through a shared NVM pool.

FIG. 2 is a block diagram illustrating a system example for executing fault-tolerant programs through a shared NVM pool. The computing system 200 may comprise a plurality of computing nodes 210: node A 210A, node B 210B, node C 210, up to node N 210N, wherein N is a positive integer. Each node from the plurality of computing nodes (e.g., node A 210) may comprise a processing unit 220 and a local NVM 230: node A 210A comprises a processing unit 220A and a local NVM 230A, node B 210B comprises a processing unit 220B and a local NVM 230B, node C 210C comprises a processing unit 220C and a local NVM 230C, up to node N 210N that comprises a processing unit 220N and a local NVM 230N, wherein N is a positive integer. Each of the processing units from the plurality of computing nodes 210 (e.g., processing unit 220A-220N) may be a CPU, SoC, a combination thereof, or the like; however for clarity purposes may be referred hereinafter as "processing unit 220A-220N". Any computing node from the plurality of computing nodes 210 may be similar or the same as the computing node 100 from FIG. 1. Any local NVM memory from a computing node from the plurality of computing nodes 210 (e.g., local NVM 230A-230N) may be the same or similar as the local NVM 130 from FIG. 1.

The computing system 200 may receive a plurality of programs to be executed (e.g., program PA, and program PB). Each program from the plurality of programs comprises one or more program instructions sets (e.g., PA comprises instructions PA1 and PA2; and PB comprises instructions PB1), each program instructions set is to be performed in an execution thread, each execution thread being executed in a computing node 220A-220N from the computing system 200.

The computing system 200 may further comprise logic (not shown in FIG. 2) to assign a memory region within the shared NVM pool 240 for each program instructions set (e.g., NVM_PA1 to execute instructions PA1, NVM_PA2 to execute instructions PA2, and NVM_PB1 to execute instructions PB1). The computing system 200 logic (not shown in FIG. 2) may further assign a plurality of computing nodes 210A-210N to run standby processes for each of the program instructions (e.g., PA1, PA2, and PB1). Table 1 shows one example of the assignment of the standby processes of instructions PA1, PA2, and PB1 to node A 210A, node B 210B, node C 210C, and node N 210N.

TABLE 1

An example of assignment of the standby processes
of instructions PA1, PA2, and PB1 to node A 210A,
node B 210B, node C 210C, and node N 210N

| Threads | Node A 210A | Node B 210B | Node C 210C | Node N 210N |
|---|---|---|---|---|
| Instructions PA1 | Standby Process | Standby Process | Standby Process | Standby Process |
| Instructions PA2 | Standby Process | Standby Process | — | — |
| Instructions PB1 | Standby Process | Standby Process | Standby Process | — |

The logic from the example of table 1 assigned all computing nodes 210A-210N to run standby processes for instructions PA1; assigned node A 210A, and node B 210B to run standby processes for instructions PA2; and assigned node A 210A, node B 210B, and node C 210C to run standby processes for instructions PB1. Therefore, in node A 210A runs an standby process for PA1, PA2, and PB1; in node B 210B runs an standby process for PA1, PA2, and PB1; in node C 210C runs an standby process for PA1, and PB1; and node N 210N runs an standby process for PA1. Table 1 merely shows an allocation example, more alternatives are possible depending on different criteria such as maximum node bandwidth, Quality of Service (QoS), instructions priorities, and the like. However, the allocation placement is out of the scope of the present disclosure.

One standby process from the plurality of standby processes for a single program instructions is elected as an active process. As a first example and referring to Table 1, the standby process running on node A 210A may be elected as the active process of PA1 (node B 210B, node C 210C, and node N 210N remain running the standby processes); the standby process running on node B 210B may be elected as the active process of PA2 (node A 210A remain running the standby process); and the standby process running on node C 210C may be elected as the active process of PB1 (node A 210A, and node B 210B remain running the standby processes). As a second example and referring to Table 1, the standby process running on node A may be elected as the active process of PA1 (node B 210B, node C 210C, and node N 210N remain running the standby processes); the standby process running on node A may also be elected as the active process of PA2 (node B 210B remain running the standby process); and the standby process running on node A may also be elected as the active process of PB1 (node B 210B and node C 210C remain running the standby processes). As the previous example shown, a single computing node may run at the same time multiple active processes from different program instructions. Furthermore, a single computing node can run at the same time an active process and a standby process of the same program instructions (e.g., node A 210A running the active process of PA1 and an standby process of PA1); this embodiment may be of use in case that the failure is not caused in the computing node but in the allocated memory within the shared NVM pool 240.

The standby processes may further detect that an active process fails by not executing the program instructions. There may be multiple ways of performing such detection, FIG. 5 discloses an example of failure detection using the shared NVM pool. Then, when a standby process detects that the active process fails, the standby process takes over the execution of the program instructions by assigning the standby process to the active process.

Figure 3:
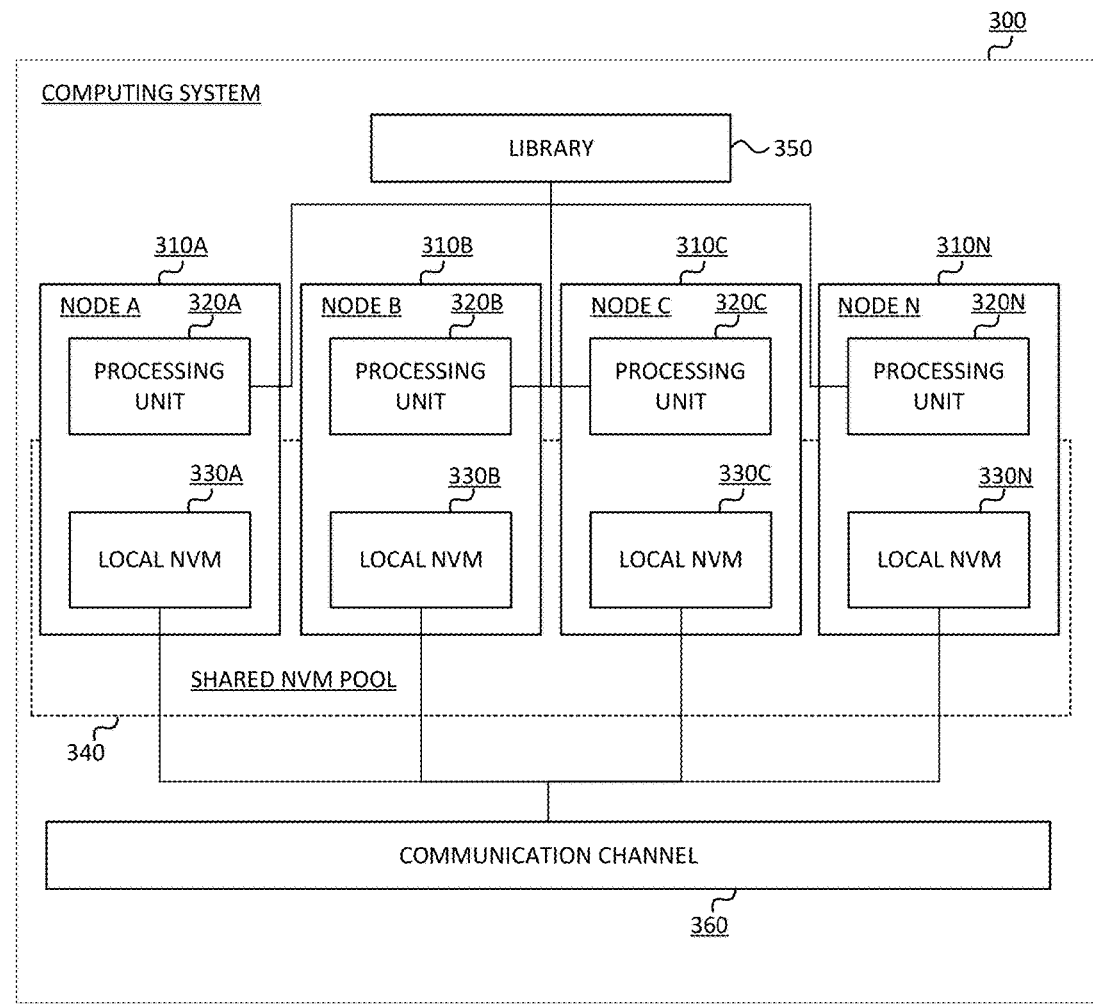
FIG. 3 is a block diagram illustrating an example system for executing fault-tolerant programs through a shared NVM pool using a library and a communication channel.

FIG. 3 is a block diagram illustrating a system example for executing fault-tolerant programs through a shared NVM pool using a library and a communication channel. The computing system 300 may comprise a plurality of computing nodes 310: node A 310A, node B 310B, node C 310C, up to node N 310N, wherein N is a positive integer. Each node from the plurality of computing nodes (e.g., node A 310A) may comprise a processing unit 320 and a local NVM 330: node A 310A comprises a processing unit 320A and a local NVM 330A, node B 310B comprises a processing unit 320B and a local NVM 330B, node C 310C comprises a processing unit 320C and a local NVM 330C, up to node N 310N that comprises a processing unit 320N and a local NVM 330N, wherein N is a positive integer. Each of the processing units from the plurality of computing nodes 310 (e.g., processing unit 320A-320N) may be a CPU, SoC, a combination thereof, or the like; however for clarity purposes may be referred hereinafter as "processing unit 320A-320N". The processing units 320A-320N may be connected to a library 350. The local NVM 330A-330N from the plurality of computing nodes 310A-310N may be connected through a communication channel to form the shared NVM pool 340. Any computing node from the plurality of computing nodes 310 may be similar or the same as the computing node 100 from FIG. 1. Any local NVM memory from a computing node from the plurality of computing nodes 310 (e.g., local NVM 330A-330N) may be the same or similar as the local NVM 330 from FIG. 1.

The processing units 320A-320N from the plurality of computing nodes 310A-310N are connected to the library 350, which assigns an assigned memory region from the shared NVM pool 340 to the program from the plurality of programs. In computing science, a library may be understood as a collection of implementations of behavior written in terms of language, which may have a well-defined interface by which the behavior is invoked. In the present application, the behavior may be understood as assigning a memory region from the shared NVM pool 340 to each of the incoming programs to execute the incoming program instructions.

For example, a system comprising four computing nodes (e.g., node 1, node 2, node 3, and node 4) each computing node comprising a local NVM (e.g., node 1 comprising local NVM 1, node 2 comprising local NVM 2, node 3 comprising local NVM 3, and node 4 comprising NVM 4), wherein each local NVM comprises, for example, two memory units (e.g., node 1 comprising MU11 and MU12, node 2 comprising MU21 and MU22, node 3 comprising MU31 and MU32, and node 4 comprising MU41 and MU42). The system receiving three programs (e.g., P1, P2, and P3), wherein the first program comprises two instruction sets (e.g., I11, and I12); the second program comprises one instruction set (e.g., I21); and the third program comprising three instructions sets (e.g., I31, I32, and I33). The system example further comprises a library to assign an assigned memory region from the shared NVM pool to each of the incoming programs (e.g., P1, P2, and P3) depending on a predetermined criteria such as maximum node bandwidth, QoS, program priority, and the like. The library may assign the first program (P1) to MU11, therefore executing the two instruction sets (I11, and I12) in MU11. The library may assign the second program (P2) to MU12 and MU21, therefore executing the second program instruction set (I21) in MU12 and MU21. The library may assign the third program (P3) to MU32, MU41 and MU42, therefore executing the third program instructions (I31, I32, and I33) in MU32, MU41, and MU42. As illustrated in the example, the library may interpret the local NVM (NVM 1-NVM 4) from the computing nodes (node 1-node 4) as a large pool of memory (MU11-MU42) assigning the incoming program instructions execution therein.

The local NVM 330A-330N from the plurality of computing nodes 310A-310N may be connected though a communication channel, wherein the communication channel provides read/write operation speeds similar or faster than a local volatile memory (e.g., DRAM speeds). An example of communication channel may be optical fiber communication.

Figure 4:
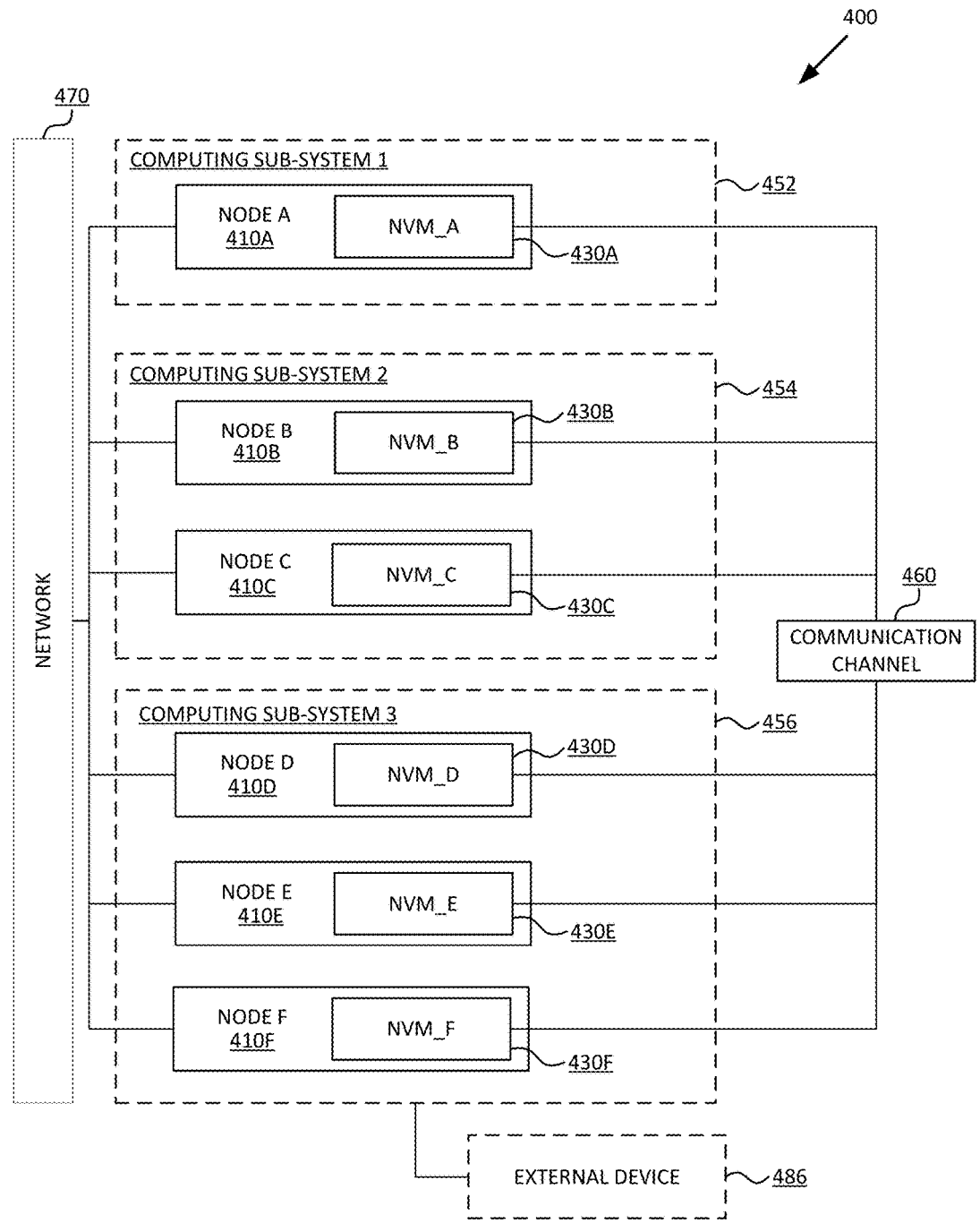
FIG. 4 is a block diagram illustrating another example system for executing fault-tolerant programs through a shared NVM pool.

FIG. 4 is a block diagram illustrating another system example for executing fault-tolerant programs through a shared NVM pool. System 400 comprises a plurality of computing nodes, however, for simplicity only six computing nodes (node A 410A-node F 410F) have been drawn. Each computing node comprises a local NVM: node A 410A comprises NVM_A 430A, node B 410B comprises NVM_B 430B, node C 410C comprises NVM_C 430C, node D 410D comprises NVM_D 430D, node E 410E comprises NVM_E 430E, and node F 410F comprises NVM_F 430F. Each local NVM NVM_A-F is connected to each other through a communication channel 460 to form a shared NVM pool. The communication channel 460 may be the same or similar as the communication channel 360 from FIG. 3. Each computing node (node A 410A-node F 410F) is connected to each other through a network 470. The plurality of nodes may be divided into different computing sub-systems: in FIG. 4 computing sub-system 1 comprises node A 410A; computing sub-system 2 comprises node B 410B, and node C 410C; and computing sub-system 3 comprises node D 410D, node E 410E, and node F 410F. An external device 486 may be connected to computing sub-system 3. Nodes A 410A-F 410F may be the same or similar to computing node 100 from FIG. 1. Local NVM A 430A-F 430F may be similar or the same as local NVM 130 from FIG. 1.

In one embodiment, system 400 may be an assembly of servers in a rack. Each computing sub-system comprise one or more computing nodes (e.g., computing sub-system 1 comprises a single node A 410A; and computing system 3 comprises three computing nodes, node D 410D-F 410F). Each computing sub-system may be a computing entity to perform a specific task. For example, computing sub-system 1 may be a network switch, and computing sub-system 3 may be a controller for an external device 486. The grouping of computing nodes into computing sub-system may vary according to the system 400 needs in order to optimize the computing resources used or to fulfill constraining requirements (e.g., one computing node must only be assigned to an specific program).

Figure 5:
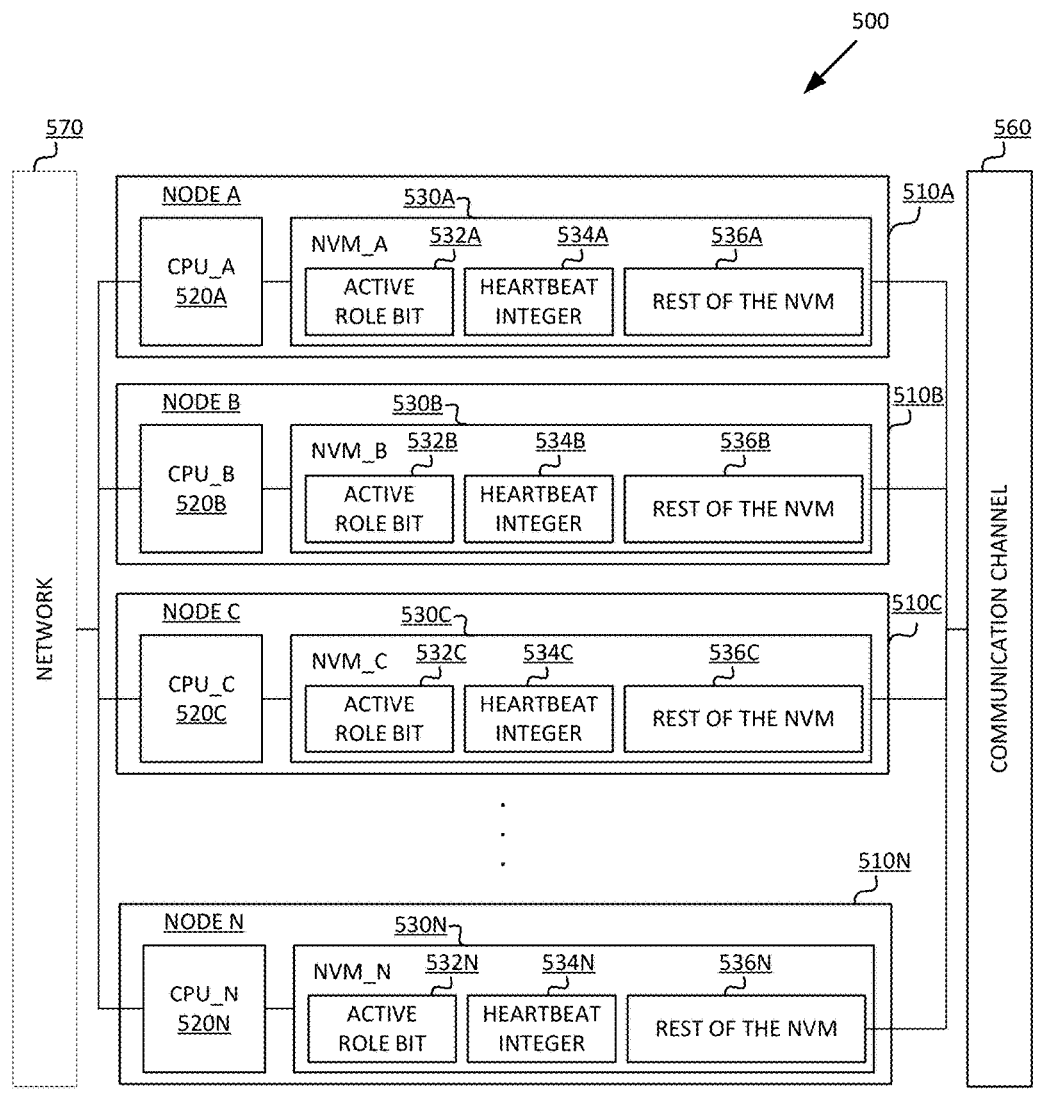
FIG. 5 is a block diagram illustrating an example system for executing fault-tolerant programs though a shared NVM pool wherein each node NVM comprises an active role bit and a heartbeat integer.

FIG. 5 is a block diagram illustrating a system example for executing fault-tolerant programs though a shared NVM pool wherein the NVM of each node comprises an active role bit and a heartbeat integer. System 500 comprises a plurality of computing nodes: node A 510A, node B 510B, node C 510C, up to node N 510N, wherein N is a positive integer. Each computing node 510A-510N comprises a processing unit and a local NVM. As of the processing units within the plurality of computing nodes 510A-510N: node A 510A comprises CPU_A 520A, node B 510B comprises CPU_B 520B, node C 510C comprises CPU_C 520C, up to node N 510N that comprises CPU_N 520N. As of the local NVM within the plurality of computing nodes 510A-510N: node A 510A comprises NVM_A 530A, node B 510B comprises NVM_B 530B, node C 510C comprises NVM_C 530C, up to node N 510N that comprises NVM_N 530N. Each local NVM comprises an active role bit, a heartbeat integer, and the rest of the NVM: NVM_A 530A from computing node A 510A comprises an active role bit 532A, a heartbeat integer 534A, and the rest of the NVM 536A; NVM_B 530B from computing node B 510B comprises an active role bit 532B, a heartbeat integer 534B, and the rest of the NVM 536B; NVM_C 530C from computing node C 510C comprises an active role bit 532C, a heartbeat integer 534C, and the rest of the NVM 536C; up to NVM_N 530N from computing node N 510N that comprises an active role bit 532N, a heartbeat integer 534N, and the rest of the NVM 536N. Each local NVM (NVM_A-N 530A-530N) is connected to each other through a communication channel 560 to form a shared NVM pool. The communication channel 560 may be the same or similar as the communication channel 360 from FIG. 3. Each computing node (node A 510A-node N 510N) is connected to each other through a network 570. Each of the plurality of computing nodes 510A-510N may be the same or similar to computing node 100 from FIG. 1. Local NVM A 530A-N 530N may be similar or the same as local NVM 130 from FIG. 1.

Each NVM from a computing node (e.g., NVM_A 530A) comprises an active role bit (e.g., active role bit 532A), a heartbeat integer (e.g., heartbeat integer 534A), and the rest of the NVM (e.g., rest of the NVM 536A). The active role bit may indicate that there is an active process executing the program instructions (e.g., active process and program instructions disclosed in FIG. 2 examples). The heartbeat integer may indicate that the execution of the program instructions require failover. The rest of the NVM may be used as a workspace for the active process to store data for execution of the program instructions.

The active role bit (e.g., active role bit 532A) may comprise a bit, therefore indicating two possible states. When the active role bit is in the first state, referred hereinafter as unavailable state, may indicate that there is an active process assigned to the program instructions. When the active role bit is in the second state, referred hereinafter as available state, may indicate that there is not any active process assigned to the program instructions, waiting for the first incoming standby process to be assigned as active process. In one example, an active role bit (e.g., ARB1) is in its unavailable state because an active process (e.g., AP1) is executing program instructions; then an incoming standby process (e.g., SP1) wants to take the active process role, however, as the active role bit is in its unavailable state, the SP1 may remain as standby process until failover is required. In another example, an active role bit (e.g., ARB2) is in its available state since no active process is executing program instructions; then an incoming standby process (e.g., SP2) wants to take the active process role, since the ARB2 is in its available state, SP2 may be assigned as the active process (e.g., AP2) of the program instructions to be executed.

The heartbeat integer (e.g., heartbeat integer 534A) is an integer value that may indicate that the execution of the program instructions require failover. For example, the active process executing the program instructions may increase the heartbeat integer by one unit every reacquire period (e.g., 10 ms). Then the heartbeat integer value is increased by one unit every reacquire period (e.g., see, example of FIG. 10). The plurality of standby processes of the program instructions may monitor that every reacquire period the heartbeat integer value is increased, otherwise they may start the failover operations to reassign a standby process to the active process.

As an example, a set of standby processes (e.g., SP1, SP2, and SP3) are monitoring that an active process (e.g., AP1) is increasing the assigned memory region within a local NVM from a computing node every reacquire time period. In order to do the previous, the set of standby processes checks the heartbeat integer value every heartbeat timeout period. The heartbeat timeout period is a period of time not shorter than the reacquire period to let the active process enough time to increase the heartbeat integer value every reacquire period. In the case the heartbeat integer value has not increased its value after a heartbeat timeout period, the monitoring standby process may assign itself as the active process and retake the execution of the program instructions. In another example, in the case the heartbeat integer value has not increased its value after a heartbeat timeout period, the monitoring standby process (e.g., SP1) may set the active role bit in the available state. In the case the active process does not change the active role bit to unavailable state after a grace period (predefined period of time), the monitoring standby process may assign itself as the active process (e.g., AP2) by setting the active role bit in the unavailable state. In the case the active process (e.g., AP1) changes the active role bit within the grace period, the monitoring standby process (e.g., SP1) may check the heartbeat integer value once again. Some embodiments from the present disclosure (e.g., FIG. 9 example), take into consideration the grace period in case it is usual that the active process delays some time to increase the heartbeat integer.

Figure 6:
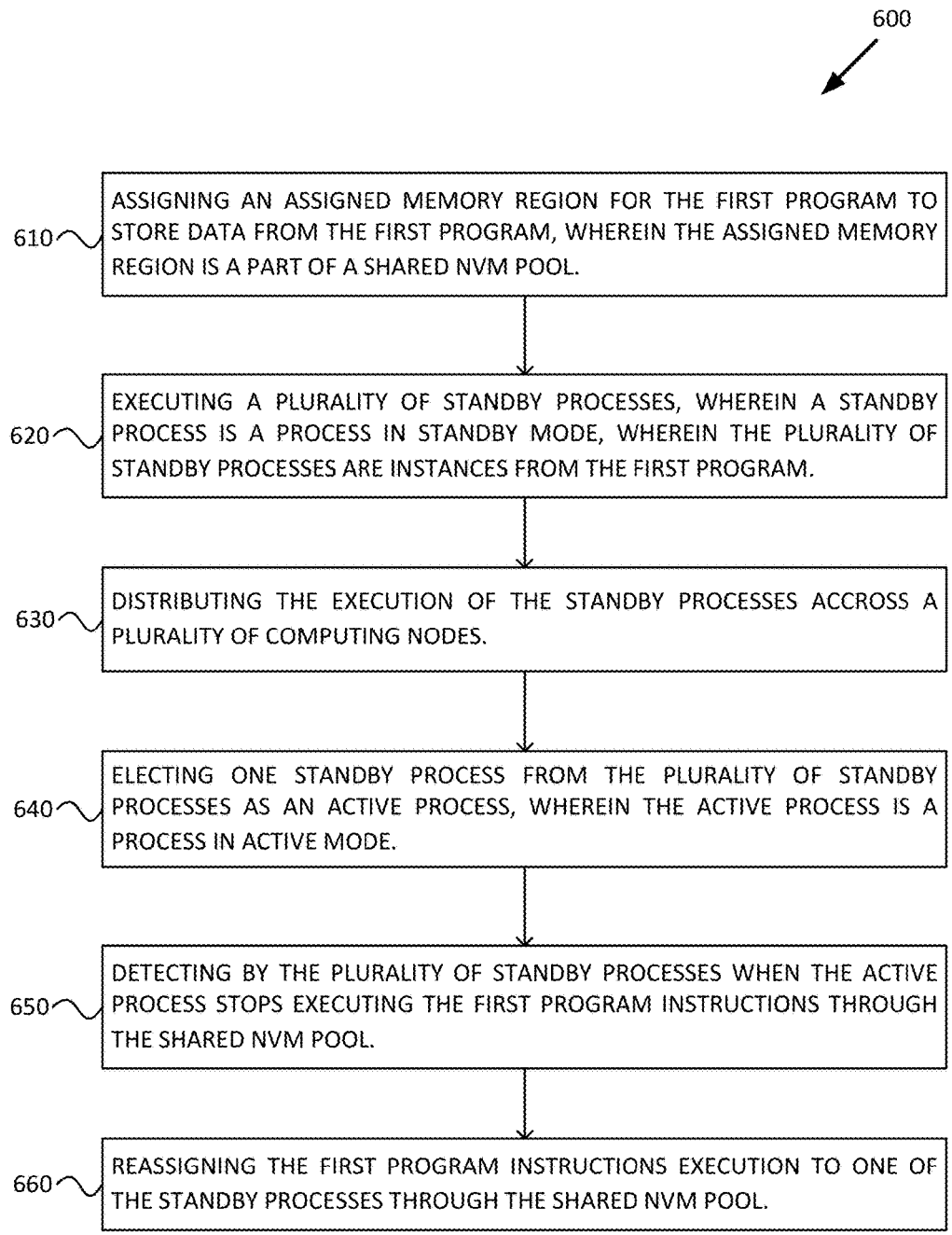
FIG. 6 is a flowchart of an example method for performing failover operations.

FIG. 6 is a flowchart of an example method for performing failover operations. The method 600 may be performed by one or more processing units such as a CPU, a SoC, a single processor and the like. For clarity purposes, the at least one processing units may be referred to as "a processor" or "the processor" hereinafter. Method 600 receives a plurality of programs, wherein each program may comprise one or more sets of program instructions to be executed. Method 600 is performed for each of the sets of program instructions to be executed, however, for clarity purposes and with no aim of restricting the scope of the present disclosure, only one set of program (e.g., the first program) instructions execution is disclosed. Method 600 may be implemented, for example, by system 100 from FIG. 1. Method 600 may also be implemented, for example, by system 200 from FIG. 2. Method 600 as well as the methods described herein can, for example, be implemented in the form of machine readable instructions stored on a memory of a computing system (e.g., implementation of instructions 1241-1246 of system 1200 from FIG. 12), in the form of electronic circuitry or another suitable form. The method 600 comprises a plurality of blocks to be performed.

At block 610, the system (e.g., system 100 from FIG. 1) assigns an assigned memory region for the first program to store data from the first program, wherein the assigned memory region is a part of a shared NVM pool. For example, in a system that comprises five computing nodes (e.g., CN1, CN2, CN3, CN4, and CN5). Each computing node may comprise a memory region, therefore the system comprising five memory regions in its shared NVM pool (e.g., M1, M2, M3, M4, and M5) receives a set of program instructions to be executed. The system may further comprise an assigning mechanism (e.g., library 350 from FIG. 3) to assign the program execution to a specific memory region (e.g., M1), the memory region comprising an active role bit, a heartbeat integer value and the remaining memory as workspace.

At block 620, the system executes a plurality of standby processes wherein a standby process is a process in standby mode, wherein the plurality of standby processes are instances from the first program. Following with the example, the system may execute four standby processes (e.g., SP1, SP2, SP3, and SP4) to execute the first program instructions.

At block 630, the system distributes the execution of the standby processes across a plurality of computing nodes. Following with the example, the system may assign SP1 to CN1, SP2 to CN2, SP3 to CN3, and SP4 to CN4. In the example, the CN5 may not have any standby process assigned.

Figure 10:
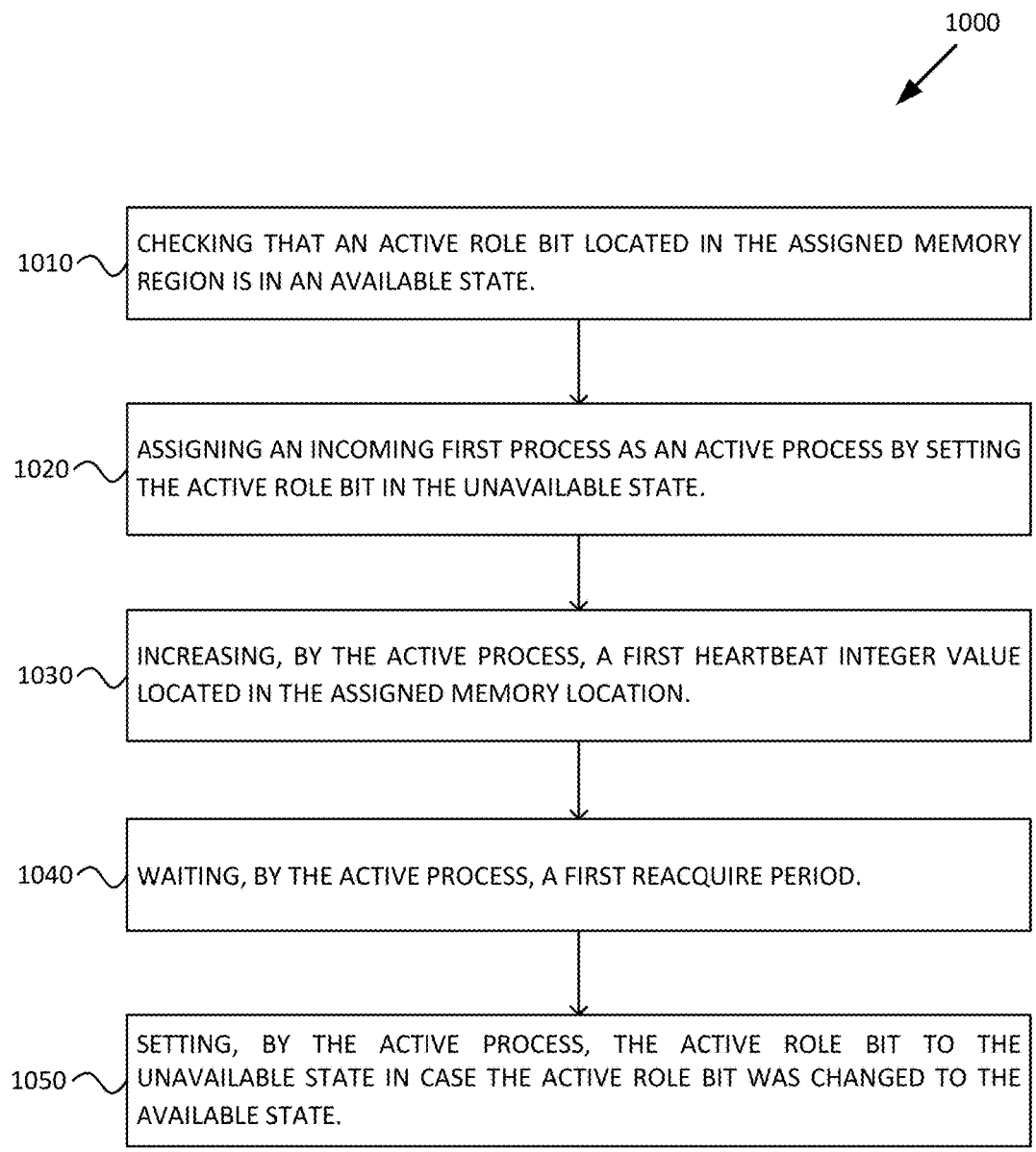
FIG. 10 is a flowchart of an example method for assigning an incoming first process as an active process and its normal behavior.

At block 640, the system elects one standby process, from the plurality of standby processes as an active process, wherein the active process is a process in active mode. Following with the example, the system may elect SP1 as the active process (AP), therefore executing the first program instructions by the AP in CN1. The standby processes (SP2, SP3, and SP4) remain monitoring that the AP does not stop executing the first program instructions. FIG. 10 discloses an example of assigning an incoming first process as an active process and its normal behavior.

Figure 8:
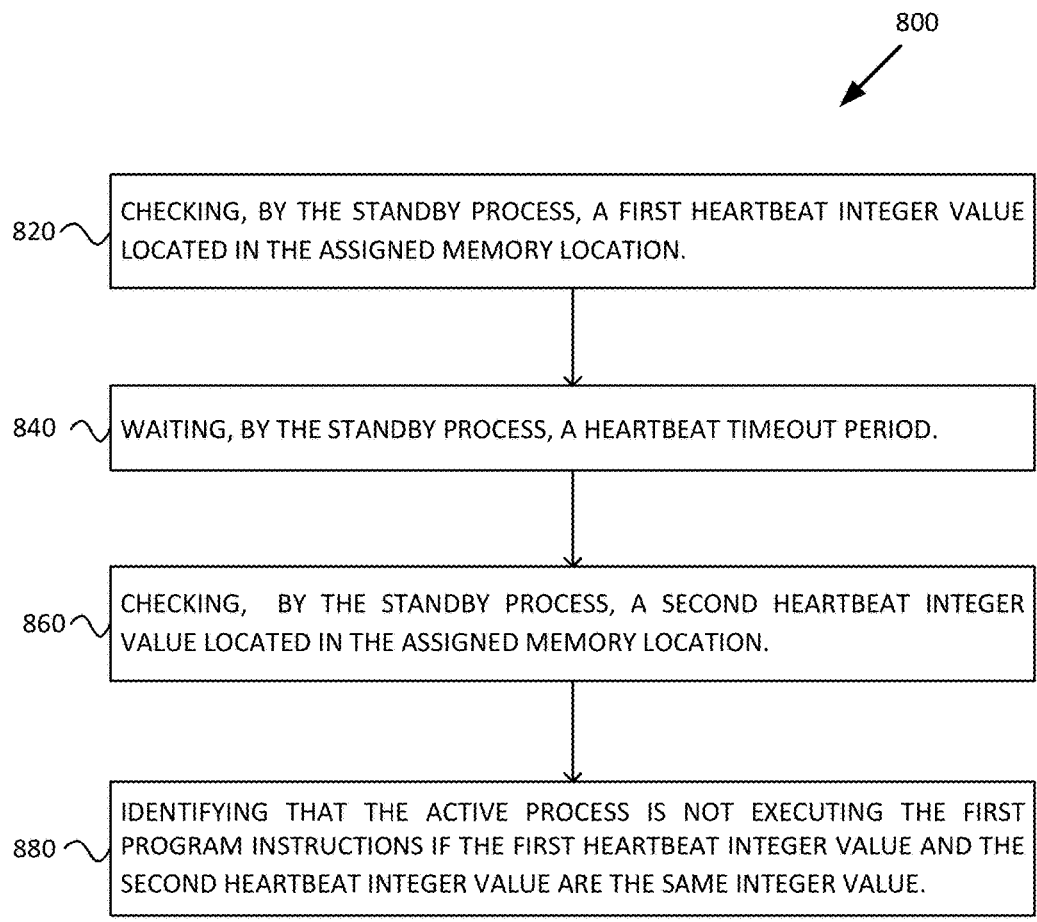
FIG. 8 is a flowchart of an example method for identifying that the active process is not executing the program instructions.

At block 650, the system detects by the plurality of standby processes when the active process stops executing the first program instructions through the shared NVM pool. Following with the example, the SP2 in CN2 detects that the AP in CN1 stops executing the first program instructions. FIG. 8 discloses an example for identifying that the active process is not executing the program instructions.

Figure 7:
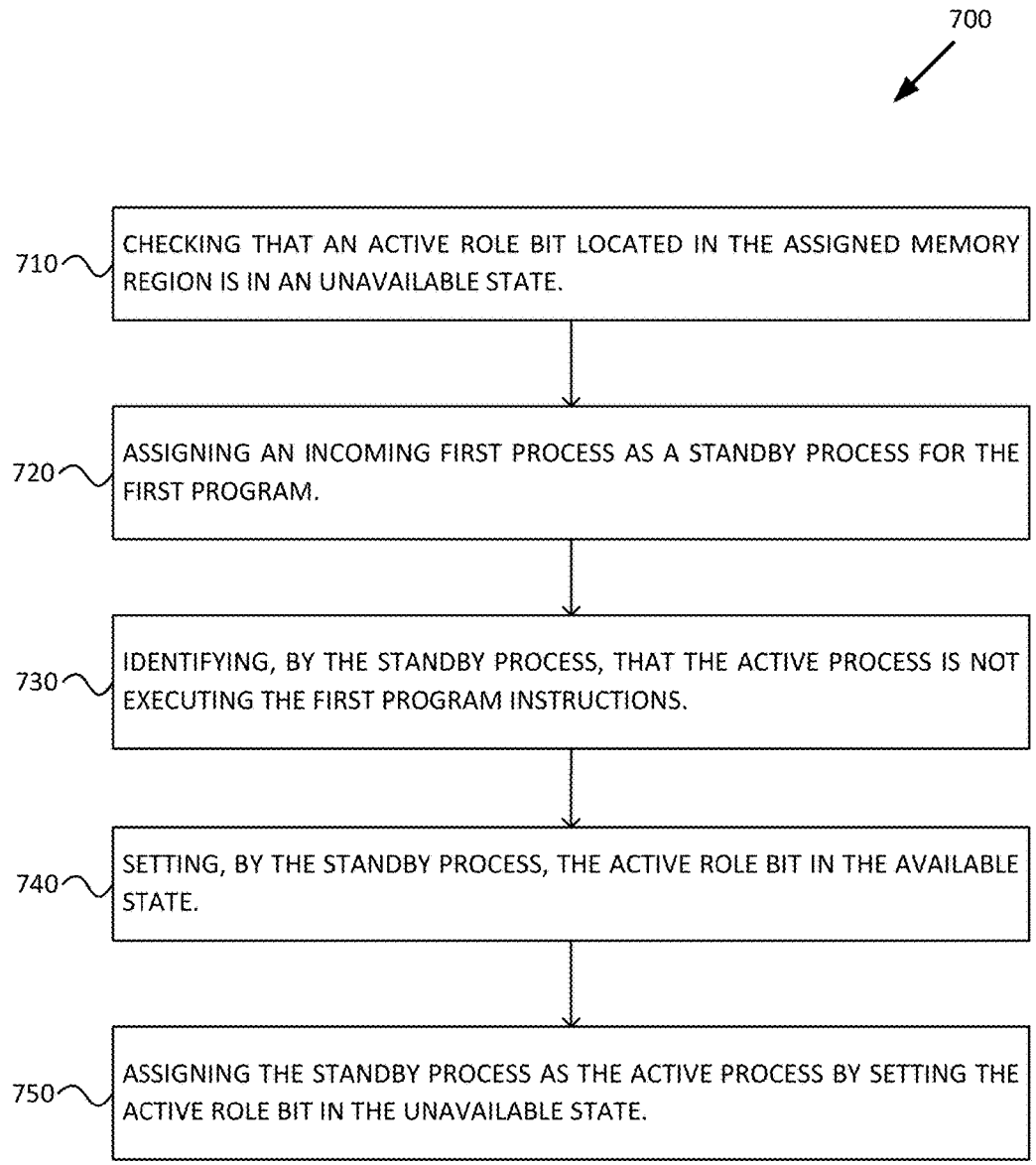
FIG. 7 is a flowchart of an example method for assigning a standby process as the active process.
Figure 9:
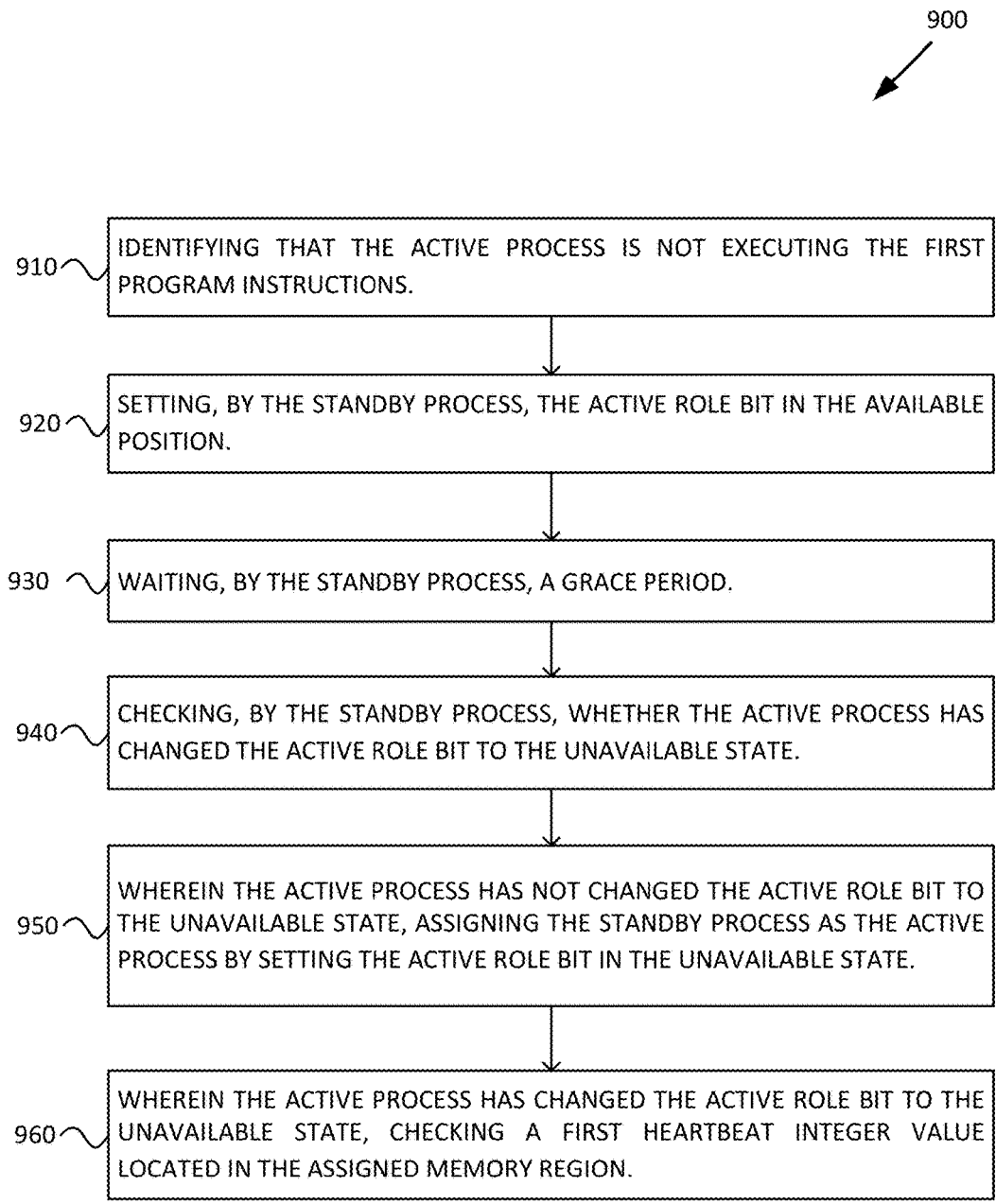
FIG. 9 is a flowchart of another example method for assigning a standby process as the active process.

At block 660, the system reassigns the first program instructions execution to one of the standby processes through the shared NVM pool. Following with the example, the system assigns SP2 in CN2 as the new AP, therefore AP in CN2 executing the first program instructions. FIG. 7 and FIG. 9 disclose examples for assigning a standby process as the active process.

FIG. 7 is a flowchart of an example method for assigning a standby process as the active process. The method 700 may be performed by one or more processing units such as a CPU, a SoC, a single processor and the like. For clarity purposes, the at least one processing units may be referred to as "a processor" or "the processor" hereinafter. Method 700 receives a plurality of programs, wherein each program may comprise one or more sets of program instructions to be executed. Method 700 may be performed for each of the sets of program instructions to be executed, however, for clarity purposes and with no aim of restricting the scope of the present disclosure, only one set of program (e.g., the first program) instructions execution is disclosed. Method 700 may be implemented in a system executing the first program instructions having a configuration of an active process running in a computing node, and one or more standby processes running in one or more computing nodes. The first program instructions have a memory unit assigned to be performed, referred hereinafter as "the assigned memory location". Method 700 may be implemented, for example, by system 100 from FIG. 1. Method 700 may also be implemented, for example, by system 200 from FIG. 2. Method 700 as well as the methods described herein can, for example, be implemented in the form of machine readable instructions stored on a memory of a computing system (e.g., implementation of instructions 1241-1246 of system 1200 from FIG. 12), in the form of electronic circuitry or another suitable form. The method 700 comprises a plurality of blocks to be performed.

At block 710, the system (e.g., system 100 from FIG. 1) checks that an active role bit located in the assigned memory region is in an unavailable state.

At block 720, the system assigns an incoming first process as a standby process for the first program.

At block 730, the standby process identifies that the active process is not executing the first program instructions. FIG. 8 discloses an example for identifying that the active process is not executing the program instructions.

At block 740, the standby process sets the active role bit in the available state.

At block 750, the system assigns the standby process as the active process by setting the active role bit in the unavailable state.

FIG. 8 is a flowchart of an example method for identifying that the active process is not executing the program instructions. The method 800 may be performed by one or more processing units such as a CPU, a SoC, a single processor and the like. For clarity purposes, the at least one processing units may be referred to as "a processor" or "the processor" hereinafter. Method 800 receives a plurality of programs, wherein each program may comprise one or more sets of program instructions to be executed. Method 800 may be performed for each of the sets of program instructions to be executed, however, for clarity purposes and with no aim of restricting the scope of the present disclosure, only one set of program (e.g., the first program) instructions execution is disclosed. Method 800 may be implemented in a system executing the first program instructions having a configuration of an active process running in a computing node, and one or more standby processes running in one or more computing nodes. The first program instructions have a memory unit assigned to be performed, referred hereinafter as "the assigned memory location". Method 800 may be implemented, for example, by system 100 from FIG. 1. Method 800 may also be implemented, for example, by system 200 from FIG. 2. Method 800 as well as the methods described herein can, for example, be implemented in the form of machine readable instructions stored on a memory of a computing system (e.g., implementation of instructions 1241-1246 of system 1200 from FIG. 12), in the form of electronic circuitry or another suitable form. The method 800 comprises a plurality of blocks to be performed.

At block 820, a standby process from the one or more standby processes of the first program instructions (referred hereinafter as "the standby process") checks a first heartbeat integer value located in the assigned memory location.

At block 840, the standby process waits a heartbeat timeout period.

At block 860, the standby process checks a second heartbeat integer value located in the assigned memory location.

At block 880, the system (e.g., system 100 from FIG. 1) identifies that the active process is not executing the first program instructions if the first heartbeat integer value and the second heartbeat integer value are the same integer value.

FIG. 9 is a flowchart of another example method for assigning a standby process as the active process. The method 900 may be performed by one or more processing units such as a CPU, a SoC, a single processor and the like. For clarity purposes, the at least one processing units may be referred to as "a processor" or "the processor" hereinafter. Method 900 receives a plurality of programs, wherein each program may comprise one or more sets of program instructions to be executed. Method 900 may be performed for each of the sets of program instructions to be executed, however, for clarity purposes and with no aim of restricting the scope of the present disclosure, only one set of program (e.g., the first program) instructions execution is disclosed. Method 900 may be implemented in a system executing the first program instructions having a configuration of an active process running in a computing node, and one or more standby processes running in one or more computing nodes. The first program instructions have a memory unit assigned to be performed, referred hereinafter as "the assigned memory location". Method 900 may be implemented, for example, by system 100 from FIG. 1. Method 900 may also be implemented, for example, by system 200 from FIG. 2. Method 900 as well as the methods described herein can, for example, be implemented in the form of machine readable instructions stored on a memory of a computing system (e.g., implementation of instructions 1241-1246 of system 1200 from FIG. 12), in the form of electronic circuitry or another suitable form. The method 900 comprises a plurality of blocks to be performed.

At block 910, the system (e.g., system 100 from FIG. 1) identifies that the active process is not executing the first program instructions (e.g., FIG. 8 example method for identifying that the active process is not executing the program instructions).

At block 920, a standby process from the one or more standby processes (referred hereinafter as "the standby process") sets the active role bit from the assigned memory location to the available state.

At block 930, the standby process waits a grace period.

At block 940, the standby process checks whether the active process has changed the active role bit from the assigned memory to the unavailable state. If the standby process checks that the active process has not changed the active role bit to the unavailable state, block 950 is performed. If the standby process checks that the active process has changed the active role bit to the unavailable state, block 960 is performed.

At block 950, the system assigns the standby process as the active process by setting the active role bit to the unavailable state.

At block 960, the standby process checks a first heartbeat integer value located in the assigned memory (e.g., block 820 from FIG. 8).

FIG. 10 is a flowchart of an example method for assigning an incoming first process as an active process and its normal behavior. The method 1000 may be performed by one or more processing units such as a CPU, a SoC, a single processor and the like. For clarity purposes, the at least one processing units may be referred to as "a processor" or "the processor" hereinafter. Method 1000 receives a plurality of programs, wherein each program may comprise one or more sets of program instructions to be executed. Method 1000 may be performed for each of the sets of program instructions to be executed, however, for clarity purposes and with no aim of restricting the scope of the present disclosure, only one set of program (e.g., the first program) instructions execution is disclosed. Method 1000 may be implemented in a system executing the first program instructions having a configuration of no active process running in any computing node, and one or more standby processes running in one or more computing nodes. The first program instructions have a memory unit assigned to be performed, referred hereinafter as "the assigned memory location". Method 1000 may be implemented, for example, by system 100 from FIG. 1. Method 1000 may also be implemented, for example, by system 200 from FIG. 2. Method 1000 as well as the methods described herein can, for example, be implemented in the form of machine readable instructions stored on a memory of a computing system (e.g., implementation of instructions 1241-1246 of system 1200 from FIG. 12), in the form of electronic circuitry or another suitable form. The method 1000 comprises a plurality of blocks to be performed.

At block 1010, the system (e.g., system 100 from FIG. 1) checks that the active role bit located in the assigned memory region is in an available state.

At block 1020, the system assigns an incoming first process as an active process by setting the active role bit in the unavailable state. The incoming first process may be a standby process from the one or more standby process.

At block 1030, the active process increases a first heartbeat integer value located in the assigned memory location.

At block 1040, the active process waits a first reacquire period.

At block 1060, in case any standby process has changed the active role bit to the available state, setting by the active process the active role bit to the unavailable state back again. Then block 1030 may be performed.

Figure 11:
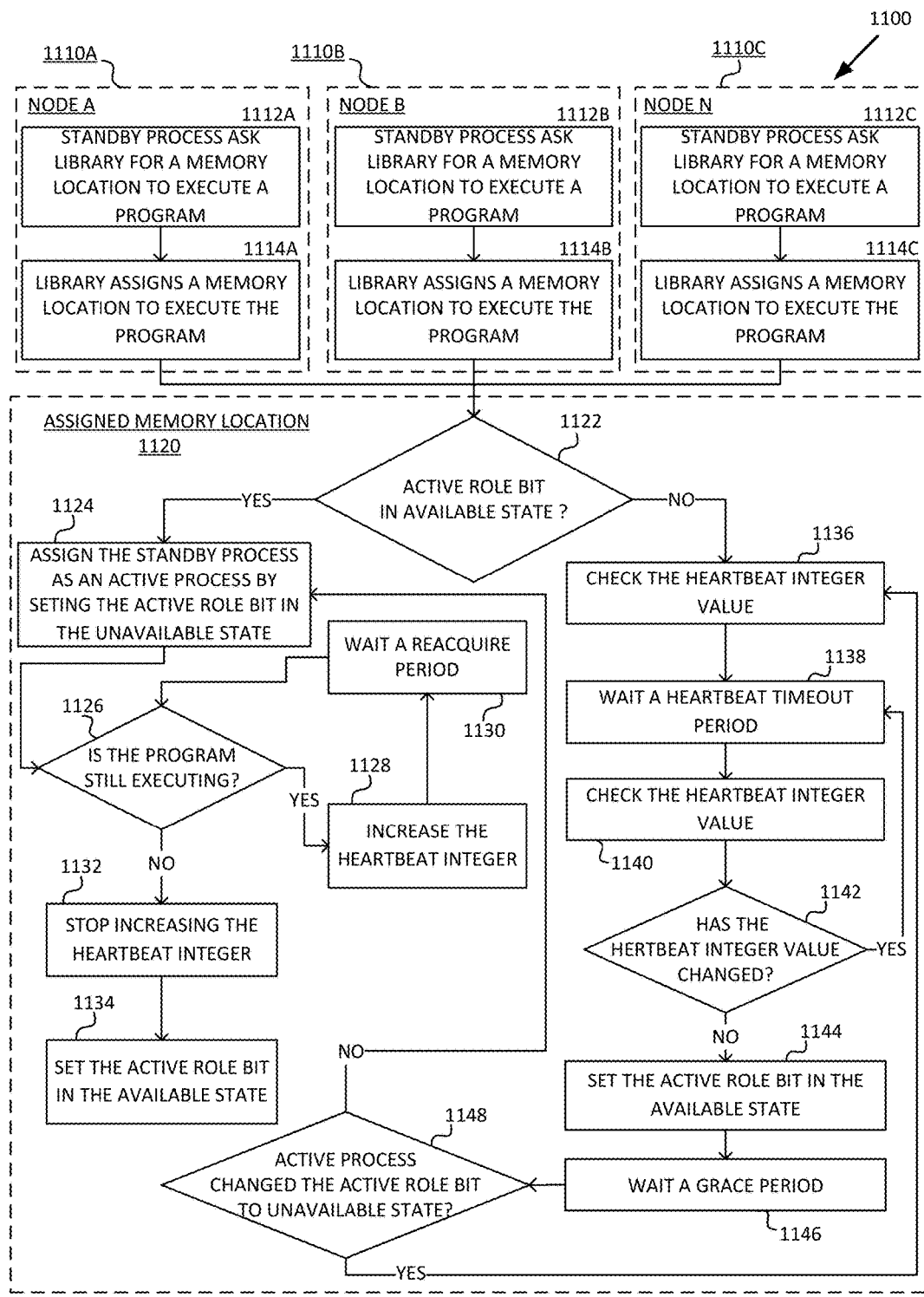
FIG. 11 is a flowchart of another example method for performing failover operations.

FIG. 11 is a flowchart of another example method for performing failover operations. The method 1100 may be performed by one or more processing units such as a CPU, a SoC, a single processor and the like. For clarity purposes, the at least one processing units may be referred to as "a processor" or "the processor" hereinafter. Method 1100 receives a plurality of programs, wherein each program may comprise one or more sets of program instructions to be executed. Method 1100 may be performed for each of the sets of program instructions to be executed, however, for clarity purposes and with no aim of restricting the scope of the present disclosure, only one set of program (e.g., the first program) instructions execution is disclosed. Method 1100 may be implemented, for example, by system 100 from FIG. 1. Method 1100 may also be implemented, for example, by system 200 from FIG. 2. Even though the method 1100 disclosed in FIG. 11 may be ran in a system with N number of computing nodes, wherein N is a positive integer, for clarity purposes and with no aim of restricting the scope of the present disclosure, only three computing nodes have been drawn (node A 1110A, node B 1110B, and node C 1110C). Method 1100 as well as the methods described herein can, for example, be implemented in the form of machine readable instructions stored on a memory of a computing system (e.g., implementation of instructions 1241-1246 of system 1200 from FIG. 12), in the form of electronic circuitry or another suitable form. The method 1000 comprises a plurality of blocks to be performed. Method 1100 receives a set of instructions to be executed from a program. Node A 1110A, node B 1110B, and node C 1110C have been assigned standby processes for the received set of instructions.

In blocks 1112A-C (depending on which node the functionality is executed), the standby process may ask the library (e.g., library 350 from FIG. 3) to assign a memory location from the shared NVM pool (e.g., shared NVM pool 140 from FIG. 1). In block 1114A-C (depending on which node the functionality is executed), the library may assign a specific memory location from the shared NVM pool to execute the received set of instructions, referred hereinafter as the assigned memory location 1120.

The process onwards may be executed in parallel by each standby process, however, for clarity purposes only one standby process is shown, referred hereinafter as "the standby process". The first block to be performed may be decision block 1122.

In decision block 1122, the standby process may check whether the active role bit within the assigned memory location 1120 is in the available state. If the active role bit is in the available state (YES branch of decision block 1122), block 1124 may be performed. If the active role bit is in the unavailable state (NO branch of decision block 1122), block 1136 may be performed.

At block 1124, the system may assign the standby process as the active process by setting the active role bit in the unavailable state. Then, the active process may start executing the incoming set of instructions, and at decision block 1126 the active process may check whether the program instructions are still executing. If the program instructions are still executing (YES branch of decision block 1126), the active process may perform block 1128. If the program instructions have already been executed (NO branch of decision block 1126), the active process may perform block 1132.

At block 1128, the active process may increase the heartbeat integer value. Then, block 1130 may be performed by waiting a reacquire period. Then, the active process may perform decision 1126 back again.

At block 1132, the active process may stop increasing the heartbeat integer, and may set the active role bit in the available state once again (block 1134). At this point, the set of instructions may have been already executed (END).

At block 1136, the standby process may check the heartbeat integer value (first heartbeat integer value) in the assigned memory location 1120. Then, at block 1138, the standby process may wait a heartbeat timeout period and may check (block 1140) again the heartbeat integer value (second heartbeat integer value). Then, the standby process may perform decision block 1142 by checking whether the first heartbeat integer value is different than the second heartbeat integer value. If the heartbeat integer value has changed (YES branch of decision block 1142), then block 1138 is performed back again. If the heartbeat integer value has not changed (NO branch of decision block 1142), block 1144 is performed by the standby process.

At block 1144, the standby process may set the active role bit located in the assigned memory location 1120 in the available state, and may wait a grace period (block 1146). Then the standby process may perform the decision block 1148 by checking whether the active process has changed the active role bit to the unavailable state. If the active process has changed the active role bit to the unavailable state (YES branch of decision block 1148), the standby process may perform block 1136 once again. If the active process has not changed the active role bit to the unavailable state (NO branch of decision block 1148), the system may assign the standby process as the active process by setting the active role bit in the unavailable state, then decision block 1126 may be performed.

Figure 12:
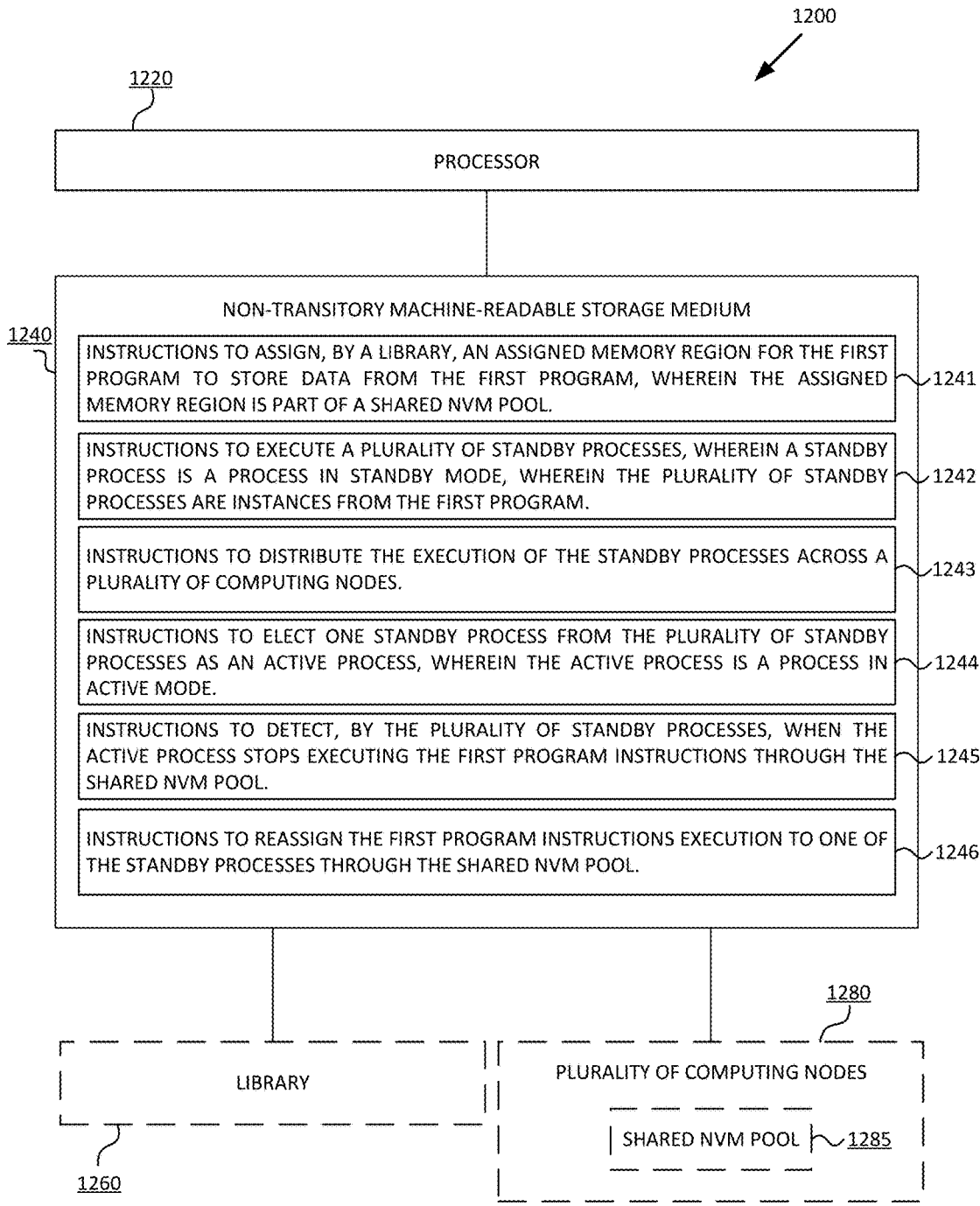
FIG. 12 is a block diagram of an example system for performing failover operations.

FIG. 12 is a block diagram of an example system for performing failover operations. FIG. 12 describes a system 1200 that includes a physical processor 1220 and a non-transitory machine-readable storage medium 1240. The processor 1220 may be a microcontroller, a microprocessor, a central processing unit (CPU) core, an application-specific-integrated circuit (ASIC), a field programmable gate array (FPGA), and/or the like. The machine-readable storage medium 1240 may store or be encoded with instructions 1241-1246 that may be executed by the processor 1220 to perform the functionality described herein. System 1200 hardware may be the same or similar as the hardware in system 100 of FIG. 1. System 1200 hardware may be the same or similar as the hardware in system 200 of FIG. 2. System 1200 may use the method 600 of FIG. 6. System 600 may use the method 1100 of FIG. 11. System 1200 may be connected to a library 1260. The library 1260 may be the same or similar as the library 350 from FIG. 3. System 1200 may be further connected to a plurality of computing nodes 1280 that comprise a shared NVM pool 1285. The plurality of computing nodes 1280 may be the same or similar as the plurality of computing nodes 110 from FIG. 1. The shared NVM pool 1285 may be the same or similar as the shared NVM pool 140 from FIG. 1.

In an example, the instructions 1241-1246, and/or other instructions can be part of an installation package that can be executed by the processor 1220 to implement the functionality described herein. In such case, non-transitory machine readable storage medium 1240 may be a portable medium such as a CD, DVD, or flash device or a memory maintained by a computing device from which the installation package can be downloaded and installed. In another example, the program instructions may be part of an application or applications already installed in the non-transitory machine-readable storage medium 1240.

The non-transitory machine readable storage medium 1240 may be an electronic, magnetic, optical, or other physical storage device that contains or stores executable data accessible to the system 1200. Thus, non-transitory machine readable storage medium 1240 may be, for example, a Random Access Memory (RAM), an Electrically Erasable Programmable Read-Only Memory (EEPROM), a storage device, an optical disk, and the like. The non-transitory machine readable storage medium 1240 does not encompass transitory propagating signals. Non-transitory machine readable storage medium 1240 may be allocated in the system 1200 and/or in any other device in communication with system 1200.

In the example of FIG. 12, the instructions 1241, when executed by the processor 1220, cause the processor 1220 to assign by the library 1260, as assigned memory region for the first program to store data from the first program, wherein the assigned memory region is a part of the shared NVM pool 1285.

The system 1200 may further include instructions 1242 that, when executed by the processor 1220, cause the processor 1220 to execute a plurality of standby processes, wherein a standby process is a process in standby mode, wherein the plurality of standby processes are instances from the first program.

The system 1200 may further include instructions 1243 that, when executed by the processor 1220, cause the processor 1220 to distribute the execution of the standby processes across a plurality of computing nodes.

The system 1200 may further include instructions 1244 that, when executed by the processor 1220, cause the processor 1220 to elect one standby process from the plurality of standby processes as an active process, wherein the active process is a process in active mode.

The system 1200 may further include instructions 1245 that, when executed by the processor 1220, cause the processor 1220 to detect, by the plurality of standby processes, when the active process stops executing the first program instructions through the shared NVM pool 1285.

The system 1200 may further include instructions 1246 that, when executed by the processor 1220, cause the processor 1220 to reassign the first program instructions execution to one of the standby processes through the shared NVM pool 1285.

The system 1200 may further include additional instructions that, when executed by the processor 1220, cause the processor 1220 to check whether an active role bit located in the assigned memory region is in an available state or in an unavailable state by the first program, wherein the unavailable state indicates that there is an elected active process executing the first program instructions in the assigned memory region.

The system 1200, wherein the active role bit is in the unavailable state, may further include additional instructions that, when executed by the processor 1220, cause the processor 1220 to, assign an incoming first process as a standby process for the first program; identify, by the standby process, that the active process is not executing the first program instructions; set, by the standby process, the active role bit in the available state; and assign the standby process as the active process by setting the active role bit in the unavailable state.

The system 1200 may further include additional instructions that, when executed by the processor 1220, cause the processor 1220 to check, by the standby process, a first heartbeat integer value located in the assigned memory region; wait, by the standby process, a heartbeat timeout period; check, by the standby process, a second heartbeat integer value located in the assigned memory region; and identify that the active process is not executing the first program instructions if the first heartbeat integer value and the second heartbeat integer value are the same integer value.

The system 1200, wherein the standby process has identified that the active process is not executing the first program instructions, may further include additional instructions that, when executed by the processor 1220, cause the processor 1220 to set, by the standby process, the active role bit in the available state; wait, by the standby process, a grace period; check, by the standby process, whether the active process has changed the active role bit to the unavailable state; wherein the active process has not changed the active role bit to the unavailable state, assigning the standby process as the active process by setting the active role bit in the unavailable state; and wherein the active process has changed the active role bit to the unavailable state, checking a first heartbeat integer value located in the assigned memory region.

The system 1200, wherein the active role bit is in the available state, may further include additional instructions that, when executed by the processor 1220, cause the processor 1220 to assign an incoming first process as an active process by setting the active role bit in the unavailable state; increase, by the active process, a first heartbeat integer value located in the assigned memory region; wait, by the active process, a first reacquire period; and set, by the active process, the active role bit to the unavailable state in case the active role bit was changed to the available state.

The system 1200, wherein the first program has completed execution, may further include additional instructions that, when executed by the processor 1220, cause the processor 1220 to set the active role bit in the available state by the active process.

The system 1200, wherein the first program is still executing the first program instructions, may further include additional instructions that, when executed by the processor 1220, cause the processor 1220 to increase, by the active process, a heartbeat integer value located in the assigned memory region; wait, by the active process, a second reacquire period; and check whether the first program is still executing the first program instructions.

The above examples may be implemented by hardware or software in combination with hardware. For example the various methods, processes and functional modules described herein may be implemented by a physical processor (the term processor is to be interpreted broadly to include CPU, processing module, ASIC, logic module, or programmable gate array, etc.). The processes, methods and functional modules may all be performed by a single processor or split between several processors; reference in this disclosure or the claims to a "processor" should thus be interpreted to mean "at least one processor". The processes, methods and functional modules are implemented as machine readable instructions executable by at least one processor, hardware logic circuitry of the at least one processors, or a combination thereof.

The drawings in the examples of the present disclosure are some examples. It should be noted that some units and functions of the procedure are not necessarily essential for implementing the present disclosure. The units may be combined into one unit or further divided into multiple sub-units. What has been described and illustrated herein is an example of the disclosure along with some of its variations. The terms, descriptions and figures used herein are set forth by way of illustration. Many variations are possible within the spirit and scope of the disclosure, which is intended to be defined by the following claims and their equivalents.

What is claimed is:

1. A computing system for executing fault-tolerant programs comprising: a computing node comprising a processing unit, and a local Non Volatile Memory (NVM), wherein the computing node is part of a plurality of computing nodes, wherein a plurality of local NVM from the plurality of computing nodes are connected to form a shared NVM pool, the computing node further comprising instructions to: receive a program comprising program instructions, wherein the program is assigned to an assigned memory region wherein the assigned memory region from the program comprise: an active role bit to indicate that there is an active process executing the first program instructions; a heartbeat integer to indicate that the execution of the first program instructions require failover; and a workspace for the active process to store data for execution of the first program instructions; execute a standby process for the program, wherein the standby process is an instance of the program in standby mode, wherein an active process for the program is executed on another one of the plurality of computing nodes, the active process being an instance of the program in active mode; detect that the active process stops executing the program instructions through the shared NVM pool; and take over execution of the program instructions through the shared NVM pool.

2. The computing system of claim 1, wherein the computing node is to detect that the active process stops executing the program instructions through the shared NVM pool by: checking whether the heartbeat integer indicates that the active process has railed; setting the active role bit to an available state; checking whether the active role bit is still set to the available state after a period of time; and transitioning to active mode and setting the active role bit to an unavailable state.

3. The computing system of claim 1, wherein the plurality of local NVM are connected through a communication channel, wherein the communication channel provides read/write operation speeds similar or faster than a local volatile memory.

4. The computing system of claim 1, wherein one or more computing nodes from the plurality of computing nodes are to form a computing sub-system.

5. The computing system of claim 4, wherein a subsystem is to form a controller module of an external device.

6. The computing system of claim 4, wherein the computing sub-system is a network switch.

7. The computing system of claim 1, further comprising a library to assign an assigned memory region from the shared NVM pool to the program from the plurality of programs.

8. A method for performing failover operations comprising: assigning an assigned memory region for a first program to store data from the first program, wherein the assigned memory region is a part of a shared Non Volatile Memory (NVM) pool; executing a plurality of standby processes, wherein a standby process is a process in standby mode, wherein the plurality of standby processes are instances from the first program; distributing the execution of the standby processes across a plurality of computing nodes; electing one standby process from the plurality of standby processes as an active process, wherein the active process is a process in active mode; detecting by the plurality of standby processes when the active process stops executing the first program instructions through the shared NVM pool reassigning the first program instructions execution to one of the standby processes through the shared NVM pool; and checking whether an active role bit located in the assigned memory region is in an available state or in an unavailable state by the first program, wherein the unavailable state indicates that there is an elected active process executing the first program instructions in the assigned memory region.

9. The method of claim 8, wherein a computing node from the plurality of computing nodes is assigned to execute the active process of the first program and a standby process of the first program.

10. The method of claim 8, wherein a computing node from the plurality of computing nodes is assigned to execute the active process of the first program and a standby process of a second program.

11. The method of claim 10, wherein the active role bit is in the unavailable state, the method further comprising: assigning an incoming first process as a standby process for the first program; identifying, by the standby process, that the active process is not executing the first program instructions; setting, by the standby process, the active role bit in the available state; and assigning the standby process as the active process by setting the active role bit in the unavailable state.

12. The method of claim 11 further comprising: checking, by the standby process, a first heartbeat integer value located in the assigned memory region; waiting, by the standby process, a heartbeat timeout period; checking, by the standby process, a second heartbeat integer value located in the assigned memory region; and identifying that the active process is not executing the first program instructions if the first heartbeat integer value and the second heartbeat integer value are the same integer value.

13. The method of claim 11, wherein the standby process has identified that the active process is not executing the first program instructions, the method further comprising: setting, by the standby process, the active role bit in the available state; waiting, by the standby process, a grace period; checking, by the standby process, whether the active process has changed the active role bit to the unavailable state; wherein the active process has not changed the active role bit to the unavailable state, assigning the standby process as the active process by setting the active role bit in the unavailable state; and wherein the active process has changed the active role bit to the unavailable state, checking a first heartbeat integer value located in the assigned memory region.

14. The method of claim 8, further assigning, by a library, the assigned memory region for the execution of the first program instructions by the active process.

15. The method of claim 8, wherein the active role bit is in the available state, the method further comprising: assigning an incoming first process as an active process by setting the active role bit in the unavailable state; increasing, by the active process, a first heartbeat integer value located in the assigned memory region; waiting, by the active process, a first reacquire period; and setting, by the active process, the active role bit to the unavailable state in case the active role bit was changed to the available state.

16. The method of claim 8, wherein the First program has completed execution, the method further comprising setting the active role bit in the available state by the active process.

17. The method of claim 8, wherein the first program is still executing the first program instructions, the method further comprising: increasing, by the active process, a heartbeat integer value located in the assigned memory region; waiting, by the active process, a second reacquire period; and checking whether the first program is still executing the first program instructions.

18. A non-transitory machine-readable medium storing machine-readable instructions executable by a physical processor, wherein the medium receives a first process to be executed, the physical processor causing the processor to: assign, by a library, an assigned memory region for the first program to store data from the first program, wherein the assigned memory region is a part of a shared Non Volatile Memory (NVM) pool; execute a plurality of standby processes, wherein a standby process is a process in standby mode, wherein the plurality of standby processes are instances from the first program; distribute the execution of the standby processes across a plurality of computing nodes; elect one standby process from the plurality of standby processes as an active process, wherein the active process is a process in active mode; detect, by the plurality of standby processes, when the active process stops executing the first program instructions through the shared NVM pool; reassign the first program instructions execution to one of the standby processes through the shared NVM pool; and check whether an active role bit located in the assigned memory region is in an available state or in an unavailable state by the first progam, wherein the unavailable state indicates that there is an elected active process executing the first program instructions in the assigned memory region.

* * * * *